United States Patent
Köhler

(10) Patent No.: US 10,829,215 B2
(45) Date of Patent: Nov. 10, 2020

(54) SYSTEM FOR MOVING LOADS IN AN AIRCRAFT

(71) Applicant: Airbus Operations GmbH, Hamburg (DE)

(72) Inventor: André Köhler, Hamburg (DE)

(73) Assignee: AIRBUS OPERATIONS GMBH, Hamburg (DE)

(*) Notice: Subject to any disclaimer, the term of this patent is extended or adjusted under 35 U.S.C. 154(b) by 0 days.

(21) Appl. No.: 16/200,774

(22) Filed: Nov. 27, 2018

(65) Prior Publication Data
US 2019/0161191 A1    May 30, 2019

(30) Foreign Application Priority Data

Nov. 29, 2017 (DE) .......................... 10 2017 128 238

(51) Int. Cl.
*B64D 9/00* (2006.01)
*B64C 1/20* (2006.01)

(52) U.S. Cl.
CPC .............. *B64D 9/003* (2013.01); *B64C 1/20* (2013.01); *B64D 9/00* (2013.01); *B64D 2009/006* (2013.01)

(58) Field of Classification Search
CPC .. B64D 9/003; B64D 2009/006; B65G 43/00; B65G 2201/0235; B65G 2201/0267; B65G 2203/0233; B64C 1/18; B64C 1/20
USPC ......................................................... 410/92
See application file for complete search history.

(56) References Cited

U.S. PATENT DOCUMENTS

| | | | | |
|---|---|---|---|---|
| 3,612,316 A | * | 10/1971 | Baldwin | B60P 1/38 414/499 |
| 3,698,679 A | * | 10/1972 | Lang | B64D 9/003 410/69 |
| 3,810,534 A | * | 5/1974 | Prete, Jr. | B60P 7/08 410/69 |

(Continued)

FOREIGN PATENT DOCUMENTS

| DE | 27 35 737 A1 | 2/1979 |
|---|---|---|
| DE | 30 27 160 A1 | 2/1982 |

(Continued)

OTHER PUBLICATIONS

German Search Report; priority document.

*Primary Examiner* — Hilary L Gutman
(74) *Attorney, Agent, or Firm* — Greer, Burns & Crain, Ltd.

(57) ABSTRACT

A system for moving loads in an aircraft, comprising a cargo hold floor and at least one roller track comprising a plurality of rollers, defining a plane of movement for the load, arranged one behind the other in the hold floor. At least one guide track is provided in the floor extending parallel to the roller track. At least one transfer vehicle is detachably received in the guide track, movable along the guide track. At least one locking device is configured, in a locking position, to block movements of a load relative to the roller track parallel to the movement plane and perpendicular to the movement plane and, in a release position, to allow relative movements. The locking device is configured to be actuated by a transfer vehicle in the guide track to shift the locking device out of the release position into the locking position, or vice versa.

14 Claims, 5 Drawing Sheets

(56) References Cited

U.S. PATENT DOCUMENTS

| | | | | |
|---|---|---|---|---|
| 4,170,292 | A | * | 10/1979 | Lang ................ B65G 25/10 104/162 |
| 4,349,168 | A | * | 9/1982 | Barnes ................ B64D 9/003 244/137.3 |
| 4,395,172 | A | * | 7/1983 | Hoener ................ B64D 9/003 244/118.1 |
| 4,401,286 | A | * | 8/1983 | Naffa ................ B64D 9/003 244/118.1 |
| 4,415,298 | A | | 11/1983 | Voigt |
| 4,426,051 | A | * | 1/1984 | Banks ................ B64D 1/10 244/137.3 |
| 4,461,437 | A | * | 7/1984 | Ashley, Sr. ........ B64D 9/003 244/137.3 |
| 4,583,896 | A | * | 4/1986 | Vogg ................ B64D 9/003 244/118.1 |
| 6,413,029 | B1 | | 7/2002 | Kernkamp |
| 6,425,717 | B1 | | 7/2002 | Saggio et al. |
| 7,556,462 | B2 | * | 7/2009 | Huber ................ B64C 1/20 410/77 |
| 8,387,919 | B2 | | 3/2013 | Huber et al. |
| 9,919,798 | B2 | | 3/2018 | Haertel et al. |
| 10,086,943 | B2 | | 10/2018 | Schoen et al. |
| 2003/0057326 | A1 | * | 3/2003 | Medina ................ B64D 9/00 244/137.1 |
| 2007/0095978 | A1 | * | 5/2007 | Oetken ................ B64C 1/20 244/118.1 |
| 2011/0215198 | A1 | * | 9/2011 | Panzram ................ B64C 1/20 244/118.1 |
| 2012/0037753 | A1 | * | 2/2012 | Huber ................ B64D 9/003 244/118.1 |
| 2013/0166063 | A1 | * | 6/2013 | Panzram ................ B64D 9/00 700/229 |
| 2015/0225082 | A1 | * | 8/2015 | Levron ................ B64D 9/00 244/137.1 |
| 2017/0197717 | A1 | * | 7/2017 | Trisotto ................ B64D 1/10 |

FOREIGN PATENT DOCUMENTS

| | | |
|---|---|---|
| DE | 41 36 973 C2 | 1/1996 |
| DE | 199 00 839 A1 | 7/2000 |
| DE | 10 2013 003 849 A1 | 9/2014 |
| DE | 10 2016 207 513 A1 | 11/2017 |
| EP | 1 527 993 B1 | 5/2005 |

* cited by examiner

SYSTEM FOR MOVING LOADS IN AN AIRCRAFT

CROSS-REFERENCES TO RELATED APPLICATIONS

This application claims the benefit of the German patent application No. 10 2017 128 238.6 filed on Nov. 29, 2017, the entire disclosures of which are incorporated herein by way of reference.

BACKGROUND OF THE INVENTION

The invention relates to a system for moving loads, which is designed for use in a cargo hold of an aircraft, and to a locking arrangement and a transfer vehicle for a system of this kind. The invention furthermore relates to a method for operating a system for moving loads in an aircraft.

Loads for transportation in cargo or passenger aircraft are usually stored in standardized containers or on standardized pallets, referred to as Unit Load Devices (ULDs). In order to be able to move the ULDs in the cargo hold of the aircraft, roller tracks are generally integrated into a floor of the cargo hold and, depending on their design, these allow directional or nondirectional movement of the ULDs. A cargo hold fitted with roller tracks of this kind is described in EP 1 527 993 B1, for example. The ULDs can be moved manually on the roller tracks. As an alternative, an electric drive system with Power Drive Units (PDUs) can be provided in or adjacent to the roller tracks, allowing automatic movement of the ULDs in the cargo hold.

Another known practice, as an alternative or in addition to any PDUs, is to provide transfer vehicles which allow movement of the ULDs along the roller tracks and parallel to the cargo hold floor. Here, transfer vehicles of this kind absorb essentially only the reaction or inertia forces that arise during the movement of the ULDs, while the significantly higher weight-associated forces are borne by the roller tracks.

A solution of this kind is known from DE 10 2013 003 849 A1, for example, in which a transfer vehicle is positioned under a load arranged on the roller tracks. A platform of the transfer vehicle is then raised in order to establish contact with the load and allow movement. U.S. Pat. No. 4,170,292 A and DE 2 735 737 A1 furthermore disclose transfer vehicles that can be moved by means of external winches, which can be brought selectively into contact with a load arranged on the roller tracks in order to move the load parallel to the cargo hold floor.

When loads, especially those in the form of ULDs, are loaded into a cargo hold and arranged within the cargo hold, it must be ensured that they remain in their predetermined position during transportation. This applies especially to the cargo hold of an aircraft, in which loads or cargo are exposed to large forces and shocks during the starting and landing of the aircraft. In order to hold the loads in their predetermined position, there are known locking devices which can be secured on the cargo hold floor or integrated into roller tracks in the cargo hold. These locking devices are actuated either manually or by means of actuating systems with electric motors, which are assigned to each locking device. These electric motors must be connected by cables to power sources and to a control system. This considerably increases the weight and complexity of the system.

SUMMARY OF THE INVENTION

It is an object of the present invention to provide a system for moving loads in an aircraft which allows efficient loading and locking of loads in a cargo hold and/or efficient unloading and release of the loads.

The solution according to the invention is described below with reference to an application in an aircraft. However, it is likewise conceivable to use the system in a stationary storage area, e.g., a warehouse.

A system for moving loads in an aircraft comprises a cargo hold floor. This can comprise any suitable materials which can withstand the weight-associated forces of the loads, e.g., metal, plastic or composite materials. The loads can comprise standardized containers or pallets in the form of ULDs but also any other cargo. The terms "cargo hold" and "cargo hold floor" can refer to an area or a section of an aircraft which is provided specifically for transporting cargo. These terms can likewise refer to an area which has been converted permanently or flexibly for this purpose. It is furthermore conceivable to provide the system in a passenger area of an aircraft or to retrofit the passenger area of an aircraft with a corresponding system. This can comprise the arrangement of the roller tracks discussed below in structures which are otherwise used to attach seating areas.

The system furthermore comprises at least one roller track, which has a plurality of rollers, which are arranged one behind the other in the cargo hold floor. The roller track can be designed to allow movement of a load in a direction parallel to the surface of the cargo hold floor. The rollers of the at least one roller track can take any suitable form, e.g., a cylindrical form or a spherical form. They can furthermore be mounted in such a way that a load arranged thereon can be moved in a direction parallel to the surface of the cargo hold floor. The rollers of the at least one roller track are preferably dimensioned in such a way that a load arranged thereon is arranged at a sufficient distance from the surface of the cargo hold floor to allow frictionless movement of the load parallel to the surface of the cargo hold floor. The roller track can furthermore have a rail or a frame element which carries the rollers. The rail or the frame element can be in the form of an elongate profile. The rail or the frame element can be mounted on a cargo hold floor.

When the system is used in an aircraft, the at least one roller track and/or the rollers arranged therein can furthermore be arranged in such a way that movement of loads is made possible, in particular along a cargo-hold or aircraft longitudinal axis. Accordingly, the rollers of the roller track can generally be arranged one behind the other along a cargo-hold or aircraft longitudinal axis.

At least one guide track is furthermore provided in the cargo hold floor. The guide track extends substantially parallel to the at least one roller track. In this case, the roller track and the guide track can take any desired rectilinear or curved form. Particularly in the case where the system is used in an aircraft, the roller track and/or the guide track can extend substantially in a straight line in order to allow rectilinear movement of the loads parallel to the roller and guide track. In one embodiment, the guide track can be delimited by two adjacent and substantially parallel roller tracks. In this case, the guide track is arranged between the side wall regions of two adjacent roller tracks and is defined thereby.

The guide track can have a bottom region, which can comprise a flat bottom surface and which can extend substantially parallel to a surface of the cargo hold floor and/or to a plane of movement of the load defined by the roller track. The bottom region can define a plane of movement of a transfer vehicle explained below. Furthermore, the guide track can comprise side wall regions, which can extend substantially parallel to one another and/or are arranged at an angle to the bottom region, the angle preferably being about 90°. The side wall regions can furthermore extend substantially parallel to an axis of movement of the transfer vehicle and/or can be defined by the side walls of adjoining roller tracks.

The guide track can comprise similar materials to the cargo hold floor and, in particular, materials which allow as far as possible low-loss movement of the transfer vehicle along the guide track, e.g., metal, plastic or composite materials.

The system for moving loads furthermore comprises at least one transfer vehicle, which is received detachably in the guide track and can be moved along the guide track. Here, the term "detachably" can refer to the possibility of simply taking out or removing the transfer vehicle from the guide track and preferably includes cases in which the transfer vehicle can be removed from the guide track without additional disassembly steps at the transfer vehicle and/or the guide track (i.e., can be removed without disassembly). For example, removal from the guide track can be enabled by automatic or manual adjustment of holding or guide elements of the transfer vehicle without the need to completely remove such elements. As a result, the transfer vehicle can thus be arranged with little effort in the guide track in order to carry out a loading and/or unloading procedure in the cargo hold. For maintenance purposes and/or when such loading procedures have ended, the vehicle can be removed from the guide track again.

In general, the transfer vehicle allows efficient movement of loads, thus enabling rapid loading and unloading of a cargo hold. Likewise, the transfer vehicle can partially or completely replace driven rollers (PDUs) provided for the purpose of moving loads, thereby making it possible to reduce costs and overall weight. Instead, the transfer vehicle can be inserted into the guide track only when required and removed from it again once the movement of loads is complete, thus avoiding an unnecessary increase in the weight of the overall system. However, it is likewise conceivable to leave the transfer vehicle permanently in the guide track. When used in an aircraft, this enables a loading procedure to be started immediately after landing, for example. The use of the driven and guide-track-bound transfer vehicle according to the invention offers significant advantages in terms of weight over PDUs distributed over a large area in the cargo hold, even when it is left permanently in the guide track as described above.

In this context, the guide track allows standardized, quick and reliable movement of the transfer vehicle along a preferred axis or path of movement. Furthermore, the guide track makes available a free space in which the transfer vehicle can be arranged and moved to enable it to be positioned under a load on the roller track. This increases design freedom in the construction of the transfer vehicle, which can thus be optimized in terms of weight, technical functionality and costs.

The transfer vehicle can furthermore have a coupling arrangement, which is designed for selective connection of the transfer vehicle to a load arranged on the roller track, thus enabling the load to be moved in accordance with a movement of the transfer vehicle. The coupling arrangement can furthermore have at least one coupling element, which can be moved between a first operating position, in which the transfer vehicle is positioned below a load arranged on the roller track, and a second operating position, in which the coupling element interacts with the load in such a way that the load can be moved together with the transfer vehicle. In other words, the transfer vehicle can push and/or shove the load through the cargo hold along the roller tracks if the transfer vehicle is coupled to the load via the coupling element situated in its second position. In the second position, the coupling element projects from the transfer vehicle beyond a plane of movement of the load defined by the rollers (i.e., beyond a virtual plane which is defined by the rollers and corresponds to a plane in which the load makes contact with the roller track) in order to interact with a load positioned on the rollers. For example, the coupling element can make contact directly or indirectly with the load, ensuring that a movement of the transfer vehicle along the guide track is transmitted to the load. Accordingly, the load can be moved with the transfer vehicle along the guide track and parallel to the surface of the cargo hold floor.

In its first position, the coupling element can be arranged in such a way that it essentially does not project from the guide track and beyond the cargo hold floor. For example, it can have a clearance with respect to a plane of movement of the load defined by the rollers or to a plane in which the load makes contact with the roller track. In this position, the transfer vehicle can move along the guide track and be arranged under a load without making contact with the load.

However, the coupling element can be designed in such a way that at least a first section of the coupling element extends from the transfer vehicle in the direction of the load in the second operating position of the coupling element in order to establish a connection between the load and the transfer vehicle. This enables a pushing force to be transmitted particularly reliably to the load as the transfer vehicle is moved in the guide track. When looking along the axis of movement of the transfer vehicle, it is possible by this means to establish (direct or indirect) positive engagement between the load and the transfer vehicle, for example. For this purpose, it is possible, in particular, for the first section of the coupling element to interact with a side wall region of the load which extends at an angle from a bottom region of the load facing the roller track. The side wall region can also include a lower edge region of the load (in the form of a transitional region between the side wall and the bottom, for example). The first section of the coupling element can be designed as a plate-shaped element in order to provide a sufficiently large contact area for the loads. In the second operating position, the first section can extend substantially perpendicularly to a plane of movement of the transfer vehicle and/or to a transfer vehicle surface facing the load. The coupling element of the transfer vehicle has a second section, which is arranged at an angle and preferably substantially perpendicularly to the first section. This makes it possible for the first and second section to be set up to enclose a lower edge region of the load in the second operating position of the coupling element.

Since the load can be supported on the roller track, the transfer vehicle does not have to be designed to bear all the weight of the load. Thus, the transfer vehicle can be made lighter and more cost-effective. The coupling element can be designed as a platform or contact pressure plate, for example, which is designed preferably to press against a bottom surface of the load in the second operating position of the coupling element in order to produce frictional forces and thus transmit a driving force of the transfer vehicle to the load. This is advantageous in as much as the transfer vehicle can interact with little expense with many different loads without having to take specific measures for this purpose on the load and/or the transfer vehicle, e.g., by way of standardized connection points. The transfer vehicle can be designed to raise the load at least temporarily over the roller track in order to move the load at least over a limited distance along the cargo hold floor without additional structural support. In general, the transfer vehicle can comprise a plurality of coupling elements, which are arranged and distributed on the transfer vehicle in such a way that they can interact with predetermined regions of a load to be picked up.

The transfer vehicle furthermore comprises a drive mechanism for moving the transfer vehicle along the guide track. In both directions, the movement of the transfer vehicle preferably takes place along an axis of movement which substantially follows the course of the guide track. In other words, the drive mechanism can allow autonomous or automatic movement of the transfer vehicle without manual assistance, e.g., manual pushing. The provision of the drive mechanism directly on the transfer vehicle makes it possible to reduce and possibly even completely eliminate any required adaptations in the cargo hold and, in particular, of the guide track for the movement of the transfer vehicle. It is thereby possible to reduce the retrofitting expenditure when retrofitting a cargo hold with the system according to the invention.

The transfer vehicle can comprise an electric motor, which generally allows reliable and precisely specifiable movement of the transfer vehicle for a reduced overall size and weight. For this purpose, the electric motor can draw power from a suitable accumulator for the storage of electric energy, e.g., a battery, which is preferably likewise arranged in the transfer vehicle and is moved together with the latter. As an alternative or in addition, provision can be made for the electric motor to draw power via a contactless power transmission system, which can be arranged at least partially in the guide track.

The drive unit can furthermore comprise at least one driven roller, one driven wheel, one driven ball, a drive chain or a drive belt, which rest against an adjacent section of the guide track, e.g., a side wall section or a bottom region. In the sense according to the invention, the term "roller" can also be understood in general to mean spherical, disc-shaped, thin-walled wheels or balls. The drive unit can furthermore comprise a drive gear, a pinion or similar. The guide track can have a section with a corresponding profile, such as a rack secured on the bottom region and lying opposite the transfer vehicle. To guide the transfer vehicle along the guide track, a rail extending along the guide track and preferably parallel to the at least one roller track can be provided. The transfer vehicle can furthermore have a receiving section, e.g., in the form of a recess, opening or similar, enabling the rail to be received therein. The receiving section can furthermore be of tunnel-shaped design in order to permit movement of the transfer vehicle along the rail. The drive unit of the transfer vehicle can furthermore have driven elements, (e.g., rollers, wheels, balls, chains or belts) which rest on the rail and/or are directly in contact with the rail. These driven elements can be preloaded against the rail, e.g., by spring elements. In this way, it is possible to produce a driving force which presses the transfer vehicle against the rail and hence against the guide track.

The transfer vehicle can furthermore have at least one transfer unit on a surface, situated opposite the load, which is arranged on the at least one roller track. The transfer unit can have one or more non-driven ball units or rollers, which comprise an omnidirectional roller. The transfer unit can allow movement of the load along the transfer vehicle (e.g., movement along and/or transversely to the transfer vehicle). This applies especially in the case in which the coupling arrangement is unactuated and is not in engagement with the load. The roller or ball units can also be actively driven, e.g., by means of electric drive units. A corresponding drive unit can be useful when the transfer vehicle is arranged close to a cargo hold door and the load initially has to be moved transversely to the at least one roller track, to the guide track or even transversely to the transfer vehicle.

The system furthermore has at least one locking device. The locking device can be brought selectively into engagement with the load (directly or indirectly) in order to lock the load in its position relative to the roller track. The locking device is designed, in the locking position thereof, to block movements of a load relative to the at least one roller track in a direction parallel to the plane of movement and in a direction perpendicular to the plane of movement and, in the release position thereof, to allow relative movements of the load. The at least one locking device is furthermore designed in such a way that it can be actuated by a transfer vehicle in the guide track in order to shift the locking device out of the release position into the locking position, or to shift the locking device out of the locking position back into the release position.

The locking device is designed to be able to lock a load in two directions in its predetermined position. The locking device locks the load in a direction perpendicular to the plane of movement of the load and in a direction parallel to the plane of movement. Thus a load, such as a ULD, can be held in two directions in its predetermined position using a single locking device. The direction parallel to the plane of movement of the loads can correspond to the direction of the longitudinal axis of the cargo hold floor or of the cargo hold.

The transfer vehicle can perform the shifting of the load and the locking/release of the load automatically, thereby allowing efficient loading and unloading of the cargo hold with the aid of the transfer vehicle. For this purpose, the transfer vehicle can be supplied by means of a control system in advance or in real time with corresponding instructions relating to the required load movements and the actuation of the locking device. The control system can be integrated into the transfer vehicle. As an alternative or in addition, the transfer vehicle can furthermore communicate with an external control system.

The at least one locking device can have at least one actuating device. At least some section or sections of the at least one actuating device can be arranged within the guide track. The at least one actuating device can be actuable within the guide track by the at least one transfer vehicle in order to shift the locking device out of the release position into the locking position and back into the release position. The transfer vehicle can move the load into its predetermined position in the cargo hold along the at least one roller track and actuate the actuating device of the locking device in order to lock the load in its predetermined position. The actuating process for the actuation of the actuating device by the transfer vehicle can be carried out completely within the guide track. In other words, actuation by the transfer vehicle is performed within the guide track, both for locking (shifting into the locking position) and for release (shifting back into the release position). It is not necessary, for example, to provide means on the transfer vehicle which project from the guide track and/or can reach over a roller track in order to actuate the locking device. A guide track can be defined by opposite side walls of two roller tracks, for example.

Actuation of the locking device within the guide track has the advantage that the actuating device cannot be blocked by loads or other elements in the cargo hold. The actuating device within the guide track is always accessible for the transfer vehicle and hence actuable by the transfer vehicle. Accordingly, efficient loading and unloading of the cargo hold can be ensured by virtue of the actuating device arranged within the guide track.

The actuating device can be arranged below a contact plane between the rollers of the at least one roller track and a load on the at least one roller track. The contact plane between the rollers and the load can be defined substantially by the outer surfaces of the rollers, which come into contact with the load.

The actuating device can be designed in such a way that the actuating device performs a predetermined type of motion to actuate the locking device. The predetermined type of motion is used for actuation to shift the locking device into the locking position and for actuation to shift the locking device into the release position. The predetermined type of motion can be a rotary motion, for example. A rotary motion can be performed in two opposite directions. A rotary motion in one direction can be assigned to shifting the locking device into the locking position. A rotary motion in the opposite direction can be assigned to shifting the locking device back into the release position. A clockwise rotary motion can be assigned to shifting the locking device into the locking position, for example, whereas a counterclockwise rotary motion can be assigned to shifting it back into the release position.

The actuating device can have at least one actuating section. The actuating section can be arranged in the guide track. The actuating section can be designed with a contour or a profile. For example, the actuating section can be in the form of a screw head (e.g., cross-type, slotted or hexagonal screw head) or can be designed in such a way that it has a recess like a spanner (e.g., hexagon (Allen), Torx). The transfer vehicle can be brought into engagement with the actuating section and can actuate the locking device by means of the actuating device. As soon as the transfer vehicle and the actuating section of the actuating device have been brought into engagement with one another, the transfer vehicle can, for example, perform a rotary motion, by means of which the locking device can be shifted into the locking position or back into the release position. By means of the actuating device, it is thus possible to create between the transfer vehicle and the locking device a purely mechanical interface which allows reliable actuation of the locking device.

The locking device can have at least one locking claw. The at least one locking claw can be arranged within a roller track. The at least one locking claw can thus be provided between adjacent rollers of the roller track. The locking claw can be pivotable out of the release position into the locking position and back again about at least one pivoting axis. When the actuating device of the locking device is actuated, the locking claw is pivoted either into the locking position or back into the release position. In the release position, the locking claw can be accommodated completely in the roller track. In the release position, the locking claw is below the contact plane between the rollers and the load in order to avoid hindering the shifting of the load. The locking claw can be designed in such a way that it locks the load in two directions in its predetermined position. The locking claw can lock the load both in the longitudinal direction (direction of the X axis of the aircraft) of the cargo hold and in the vertical direction, i.e., in a direction perpendicular to the plane of movement (direction of the Z axis of the aircraft). The pivoting axis of the at least one locking claw can extend parallel to the axes of rotation of the rollers of the roller track. The pivoting axis of the at least one locking claw can thus extend perpendicularly to the longitudinal axis of the cargo hold and also to the direction of movement of the transfer vehicle in the guide track.

The actuating device can have a connecting section. By means of the connecting section, the actuating device can be connected to the at least one locking claw. At least some section or sections of the connecting section can extend along the pivoting axis of the at least one locking claw. The connecting section can be in the form of a shaft, of a cylinder or of a column. The connecting section can be designed in such a way that a rotary motion of the actuating element brings about a pivoting motion of the locking claw. The connecting section can be accommodated partially in an opening of the locking claw. The connecting section can be connected to the locking claw by a connecting means, e.g., in the form of a screw or of a bolt. The connecting section can extend through an opening in a side wall of a roller track. The actuating section can be arranged on one side of the side wall of the roller track, and the connecting section can be connected to the at least one locking claw on the opposite side of the side wall. In other words, the connecting section can be passed through the opening in the side wall of the roller track and connected to the locking claw arranged in the roller track.

The locking device can be a purely mechanical apparatus. The locking device can be actuated mechanically by means of the actuating device. The locking device can furthermore be held in its locking position or in its release position in a purely mechanical way. Since the locking device does not have any electric or electronic components, the locking device cannot be impaired by power failures or other electrical faults. It is not possible, for example, for the locking device to accidentally release the load during transportation or flight owing to an electrical fault. The locking device thus has a high reliability while being of simple construction.

The locking device can form a unit. This unit can be inserted between individual modules of a roller track. The locking device can furthermore be arranged in a roller track. In this case, the locking device can be secured on at least one side wall of the roller track.

The transfer vehicle can have an actuator, which mechanically actuates the actuating device of the locking device. The actuator can be designed to mechanically actuate the actuating device within the guide track. The actuator can be brought into engagement within the guide track with the actuating device of the locking device. For example, the actuator can be brought into engagement with the actuating device by a movement of the transfer vehicle along the guide track. Thus, the transfer vehicle and/or the actuator does/do not have to perform any additional movements in order to bring the actuator into engagement with the actuating device. As soon as the actuator is in engagement with the actuating device, the actuating device and hence the locking device can be mechanically actuated by the actuator.

The actuator of the transfer vehicle can have at least one actuating element. The actuating element can be of complementary design to the profile or the contour of the actuating section of the actuating device. The actuating section can be brought into engagement with the actuating element of the actuator in order to actuate the locking device. The actuating section can be brought into engagement with the actuator of the transfer vehicle by a movement of the transfer vehicle along the guide track. The actuator of the transfer vehicle can drive the actuating element in order to actuate the actuating section. For example, the actuating device can transmit a rotary motion transmitted from the actuator to the actuating section via the actuating element to the at least one locking claw, which is shifted into the position corresponding to the actuating direction.

The transfer vehicle can have a monitoring unit. By means of the monitoring unit, the state of the locking device can be checked. For example, the monitoring unit can be used to check whether the locking position or the release position has actually been reached or assumed by the locking device. The monitoring unit can furthermore be used to check the functioning capacity of the locking device. The monitoring unit can have a force sensor and/or a rotation angle sensor in order to check the state of the locking device. By means of these sensors, the monitoring unit can obtain feedback indicating whether the locking device is capable of functioning, i.e., that there is no damage and/or requirement for maintenance. In particular, a rotation angle sensor can be used to determine whether the locking device has actually assumed the release position or the locking position since the locking claws assume predetermined angular positions in their respective position. In this context, the monitoring unit can interact with the actuator on the transfer vehicle.

The locking device can have at least two locking claws. The at least two locking claws can be connected to one another by at least one spring element. Projections, on which the at least one spring is secured, can be formed on the locking claws. When one of the locking claws is actuated, the at least one spring enables the other of the locking claws to follow the movement of the actuated locking claw. The locking claw which follows the movement of the actuated locking claw can be in engagement with the transfer vehicle, thereby enabling the pivoting motion of this locking claw to be controlled. By means of the spring, both locking claws can be pivoted about their pivoting axis, e.g., counterclockwise into the release position and clockwise into the locking position. The at least one spring element can be a tension spring, for example.

The present invention furthermore relates to a locking device for a system of the type described above. Moreover, the present invention relates to a transfer vehicle for a system of the type described above. The locking device and/or the transfer vehicle are designed for use with the system described above.

The invention furthermore relates to a method for operating a system for moving loads in accordance with the aspects described above.

BRIEF DESCRIPTION OF THE DRAWINGS

Preferred embodiments of the invention are explained in greater detail below with reference to the attached drawings, in which.

DETAILED DESCRIPTION OF THE PREFERRED EMBODIMENTS

A system according to one embodiment of the present invention is described below with reference to FIGS. 1 to 6.

Figure 1:
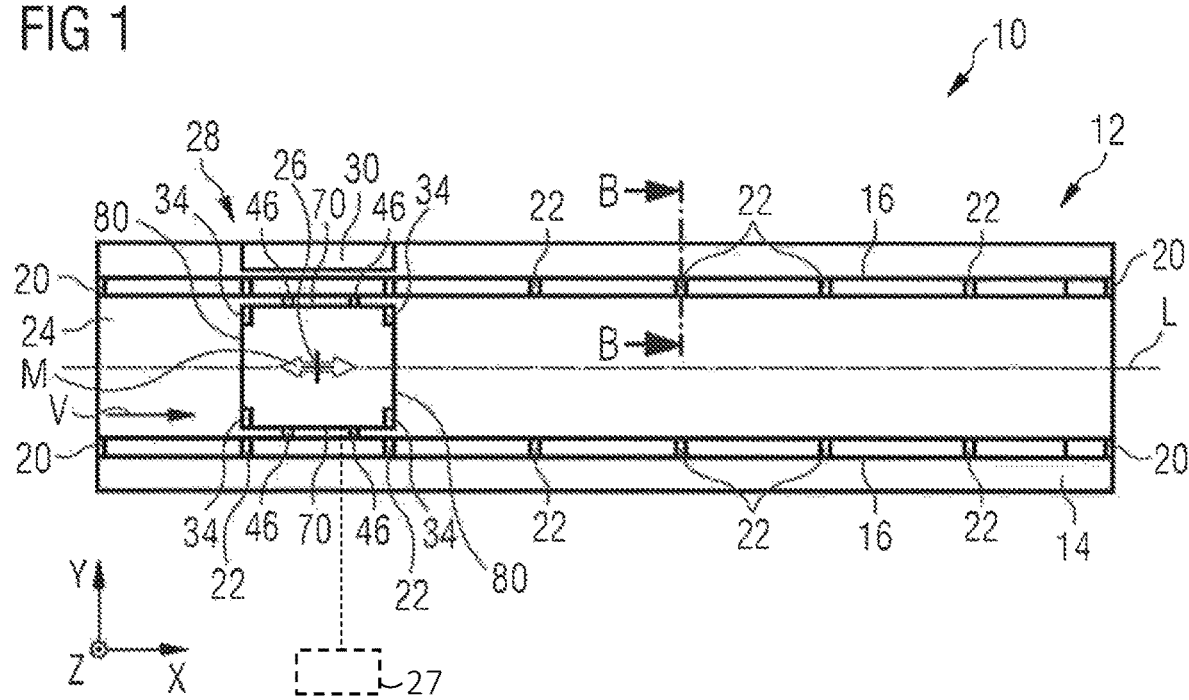
FIG. 1 shows a plan view of the cargo hold of an aircraft, which comprises a system according to the invention for moving loads.

FIG. 1 shows a cargo hold 10 of an aircraft, which has a system 12 for moving loads in accordance with one embodiment of the present invention. The system 12 comprises a cargo hold floor 14, which has a longitudinal axis L. The longitudinal axis L of the cargo hold floor corresponds substantially to the longitudinal axis of the cargo hold 10. The longitudinal axis L corresponds substantially to an X axis of an aircraft according to a standardized aircraft coordinate system. This standardized aircraft coordinate system is illustrated in FIG. 1.

The system furthermore has two roller tracks 16, which are arranged parallel to one another and extend along the longitudinal axis L. Each of the roller tracks 16 has a multiplicity of cylindrical rollers 18, which are not shown in FIG. 1 (see FIG. 2). Each of the rollers 18 rotates about its own rotation axis, which extends substantially orthogonally to the longitudinal axis L and parallel to a surface of the cargo hold floor 14.

The outer circumferential surfaces of the rollers 18 define a virtual plane P, which extends parallel to the cargo hold floor 14. The plane P corresponds to a contact plane between the rollers 18 and a load situated on the roller tracks 16. Furthermore, the plane P corresponds to a plane of movement of the load relative to and along the cargo hold floor 14. The roller tracks 16 allow a load, such as ULDs, to be pushed and/or pulled along the longitudinal axis L. In the end sections along the longitudinal axis L, the roller tracks 16 each comprise a stop element 20, which prevents further movement of the load along the roller tracks 16.

The roller tracks 16 furthermore have a multiplicity of locking devices 22, which are arranged at predetermined intervals along the longitudinal axis L. The locking devices 22 are arranged between two adjacent rollers 18 of the respective roller track 16. The positions of the locking devices 22 in the two roller tracks 16 are matched to one another. In the direction of the longitudinal axis L, the locking devices 22 are arranged at the same position in both roller tracks 16. As shown in FIG. 1, the locking devices 22 are integrated into the roller tracks 16.

The locking devices 22 block a relative movement between the loads and the roller tracks 16 in the direction of the longitudinal axis L of the cargo hold floor, i.e., in the direction of the X axis of the aircraft. The locking devices 22 can furthermore also block a relative movement in the direction of the Z axis. In other words, in their locking position, the locking devices 22 block a movement of the loads relative to the roller tracks 16 in a direction (direction of the Z axis of the aircraft) perpendicular to the plane of movement P and in a direction (direction of the X axis of the aircraft) parallel to the plane of movement P of the loads. For this reason, locking devices 22 of this kind are also often referred to as XZ locking systems ("XZ latches").

The roller tracks 16 define a guide track 24 which extends between the two roller tracks 16 and along the longitudinal axis L. The guide track 24 defines a free space within or on the cargo hold floor 14 for releasably accommodating a transfer vehicle 26. As indicated by arrow M, the transfer vehicle 26 can move along the longitudinal axis L within the guide track 24 in order to push and/or pull cargo, such as ULDs, along the roller tracks 16. Arrow M defines an axis of movement of the transfer vehicle 26.

The cargo hold 10 has a cargo door area 28 with a door sill 30. Cargo can be loaded into the cargo hold 10 essentially in a known manner through the cargo door area 28. This can comprise a movement along the Y axis and hence transversely to the longitudinal axis L. In order to permit such a movement, the cargo hold floor 14, the roller tracks 16 and/or the transfer vehicle 26 can have transfer units, such as omnidirectional rollers or ball mats or the like.

The transfer vehicle can have a monitoring unit 27. By means of the monitoring unit 27, the state of the locking device can be checked. For example, the monitoring unit 27 can be used to check whether the locking position or the release position has actually been reached or assumed by the locking device. The monitoring unit 27 can furthermore be used to check the functioning capacity of the locking device. The monitoring unit 27 can have a force sensor and/or a rotation angle sensor in order to check the state of the locking device. By means of these sensors, the monitoring unit 27 can obtain feedback indicating whether the locking device is capable of functioning, i.e., that there is no damage and/or requirement for maintenance. In particular, a rotation angle sensor can be used to determine whether the locking device has actually assumed the release position or the locking position since the locking claws assume predetermined angular positions in their respective position. In this context, the monitoring unit 27 can interact with the actuator on the transfer vehicle.

Figure 2:
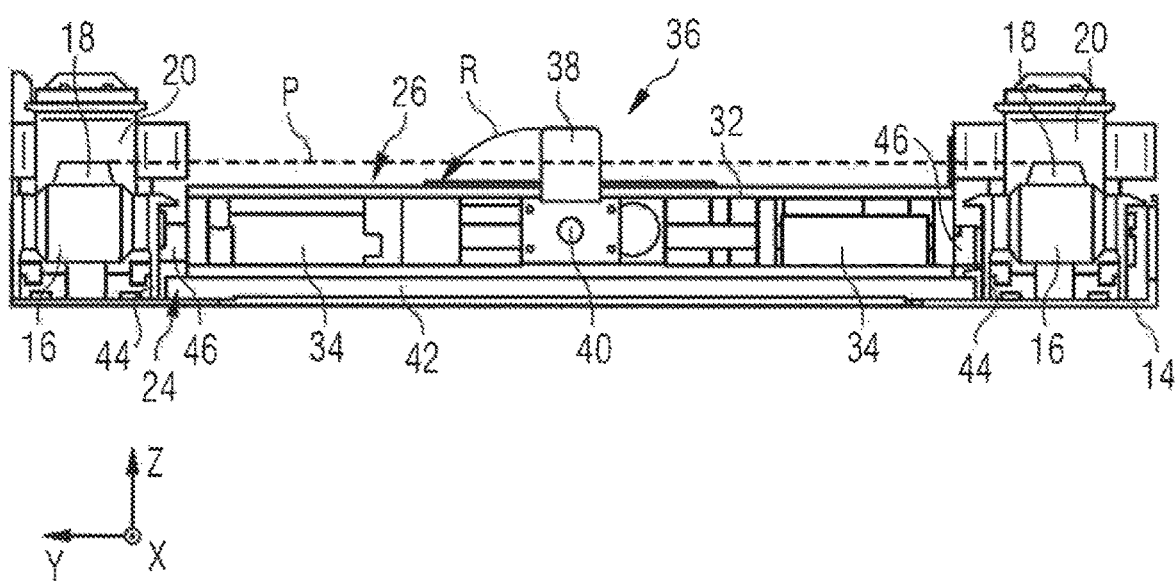
FIG. 2 shows a front view of a transfer vehicle arranged in a guide track of the system shown in FIG. 1.

FIG. 2 shows a schematic front view of the transfer vehicle 26 along arrow V in FIG. 1. In FIG. 2, the roller tracks 16 and the guide track 24 enclosed by the roller tracks 16 are furthermore shown. In FIG. 2, the rollers 18 within the roller tracks 16 are visible.

The transfer vehicle 26 has a substantially rectangular frame 32, which carries the various units and components of the transfer vehicle 26. The transfer vehicle 26 has driven rollers 34. The driven rollers 34 are part of a drive unit of the transfer vehicle 26, which furthermore has an electric motor (not shown).

FIG. 2 shows a coupling arrangement 36, which has a plate-shaped coupling element 38. In FIG. 2, the coupling element 38 is illustrated in its active state, in which it projects above the contact plane P defined by the outer surfaces of the rollers 18. In this (first) position, the coupling element 38 can make contact with a load positioned on the roller tracks 16 and in this way can transmit a movement of the transfer vehicle 26 to the load in order to shift the load along the roller tracks 16 and parallel to the surface of the cargo hold floor 14.

The coupling element 38 can be put into an inactive state. In the inactive state, the coupling element 38 assumes a second position below the contact plane P and extends substantially within the frame 32 of the transfer vehicle 26. The movement from the first position into the second position and back again is accomplished by means of a pivoting motion about a rotation axis 40 in accordance with arrow R in FIG. 2. In the second position, the transfer vehicle 26 can be moved under a load without making contact with the load or colliding with the load.

The guide track 24 has a bottom region 42, which extends parallel to the cargo hold floor 14, and two side wall sections 44, which are each formed by a side wall section of the roller tracks 16. The transfer vehicle 26 has a multiplicity of passive guide rollers 46. These passive guide rollers 46 center the transfer vehicle 26 when it moves along the guide track 24.

Figure 3:
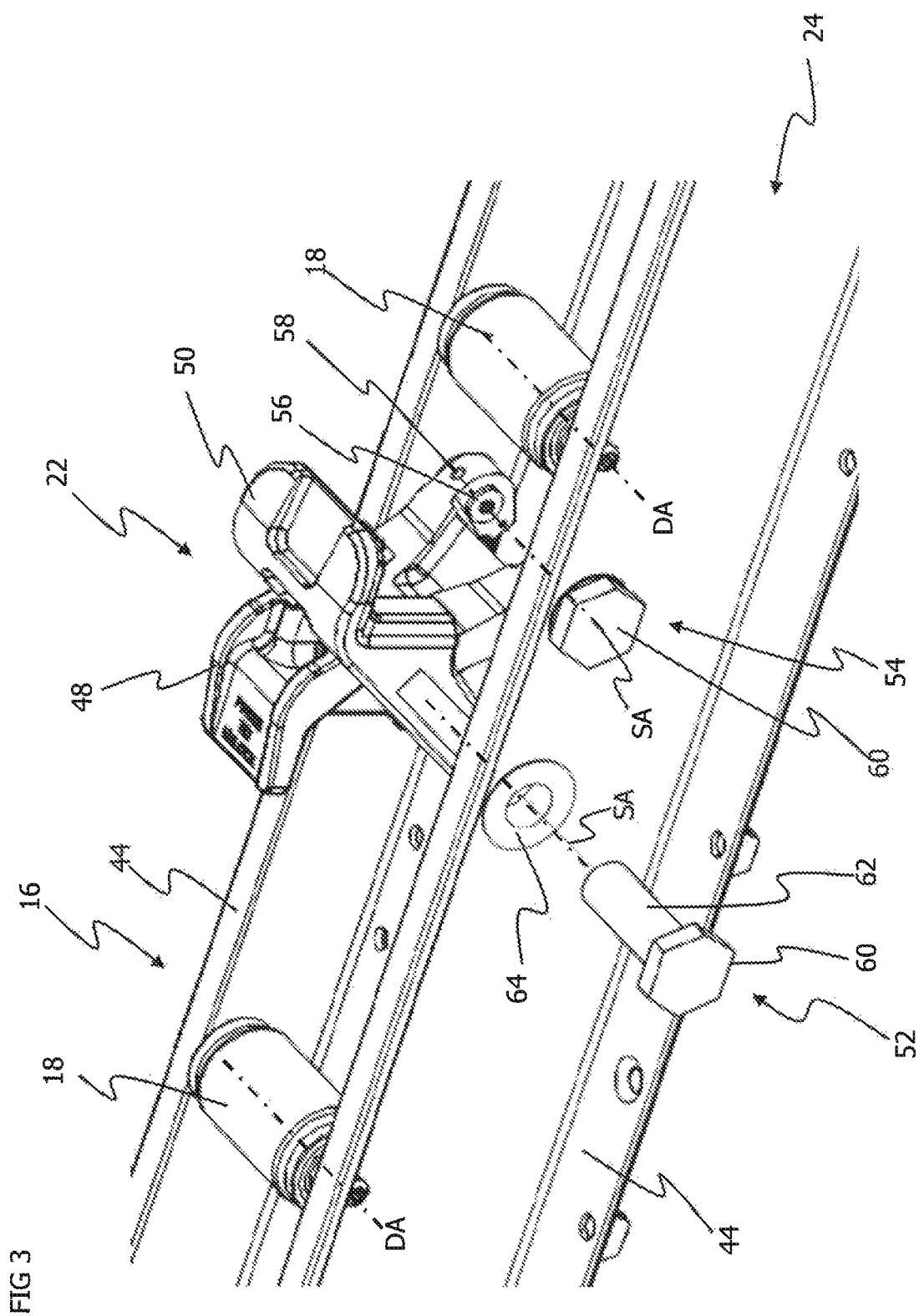
FIG. 3 shows a perspective view of a locking device in the mounted state on a roller track.

FIG. 3 shows a perspective view of a locking device 22 in the mounted state on a roller track 16. The locking device 22 shown is in its locking position. As can be seen in FIG. 3, the locking device 22 is largely integrated into the roller track 16. The locking device 22 is arranged between two adjacent rollers 18 and connected to the side walls 44 of the roller track 16.

The locking device 22 has two locking claws 48, 50 and two actuating devices 52 and 54. The locking claws 48, 50 are in their locking position, in which they can block movements of the load relative to the roller tracks 16 both in the direction of the X axis and in the direction of the Z axis. One of the actuating devices 52 and 54 is assigned to each of the locking claws 48 and 50. The locking claws 48 and 50 are secured on the side walls 44 of the roller track 16 by means of the actuating devices 52, 54 and bearing elements 56 (only visible on claw 48). The locking claws 48 and 50 are fixed on the actuating devices 52, 54 and the bearing elements 56 by fastening means 58 (only visible on bearing element 56 on claw 48). Screws or bolts can be used as fastening means 58, for example.

The actuating device 52, 54 has an actuating section 60 and a connecting section 62. The connecting section 62 connects the actuating section 60 to the respective locking claw 48 or 50. The connecting section 62 is of shaft- or rod-shaped design and extends through an opening 64 in the side wall 44 of the roller track 16. Within the roller track 16, each of the locking claws 48 and 50 is connected to the actuating device 52 and 54 assigned thereto. The actuating devices 52 and 54 are rotatable about the axes SA. The axes SA correspond to the pivoting axes of the locking claws 48, 50. A rotary motion of the actuating devices 52, 54 about the axes SA thus leads to a pivoting motion of the locking claws 48, 50 about the pivoting axes SA.

The actuating section 60 of the actuating devices 52, 54 is arranged in the guide track 24. The guide track 24 is delimited by the side wall 44 of the roller track 16. The guide track 24 extends along the side of the side wall 44 which faces away from the locking claws 48 and 50. The transfer vehicle 26 moves in the guide track 24 (see FIGS. 1 and 2). The actuating section 60 can thus be reached in the guide track 24 by the transfer vehicle 26. The transfer vehicle 26 can actuate the actuating devices 52 and 54 by means of the actuating section 60 in order to shift the locking device 22 both into the locking position and back into the release position. The transfer vehicle 26 can be brought into engagement with the actuating section 60 by means of a movement along the guide track 24, i.e., in the direction of arrow M in FIG. 1. As soon as there is engagement between the transfer vehicle 26 and the actuating section 60, the transfer vehicle 26 can activate one or both of the actuating devices 52, 54 in order to actuate the locking device 22.

For actuation by the transfer vehicle 26, the actuating section 60 of the actuating devices 52, 54 is provided with a profile or a contour. According to FIG. 3, the actuating section 60 of the actuating devices 52, 54 is in the form of a hexagon head. However, the actuating section 60 can assume any other desired shape suitable for the transmission of torques. By means of the actuating section 60 of the actuating devices 52, 54, the locking claws 48, 50 are shifted between the locking position and the release position. An actuator is provided on the transfer vehicle 26 (not shown in FIG. 3), the actuator having an actuating element complementary to the actuating section 60. The actuating element of the transfer vehicle 26 is brought into engagement with the actuating section 60. The actuator of the transfer vehicle 26 drives the actuating element in such a way that it performs a rotary motion. By means of the engagement of the actuating element of the transfer vehicle with the actuating section 60, this rotary motion is transmitted to the actuating device 52, 54. By virtue of this rotary motion of the actuating device 52, 54 about the axis SA, the corresponding locking claw 48, 50 is shifted into the locking position or into the release position. When the actuating devices 52, 54 are actuated by the transfer vehicle 26, the actuating device 52, 54 performs a rotary motion about the axis SA, which leads to a pivoting motion of the respective locking claw 48, 50 about the pivoting axis SA. The pivoting axis SA of the actuating devices 52, 54 extends parallel to the rotation axes DA of the rollers 18.

Figure 4:
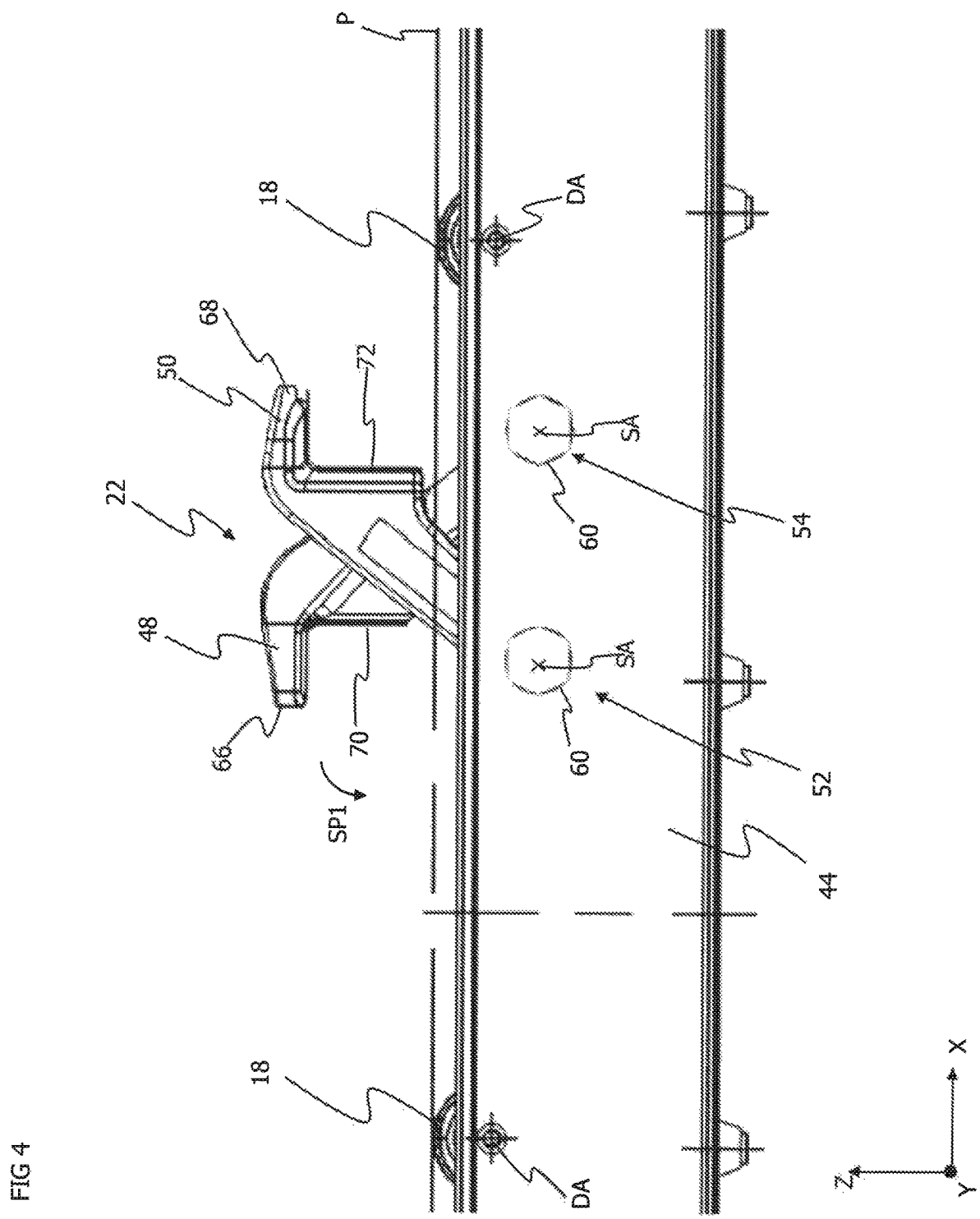
FIG. 4 shows a side view of the locking device in the locking position in the mounted state on the roller track.

FIG. 4 shows a schematic side view of the locking device 22 in the mounted state on the roller track 16. In FIG. 4, the actuating sections 60 of the actuating devices 52, 54 are visible in schematic form. The pivoting or rotation axes SA of the actuating devices 52, 54 and of the locking claws 48, 50 extend parallel to the rotation axes DA of the rollers 18.

FIG. 4 furthermore shows the plane of movement or contact plane P, which is defined by the outer surfaces of the rollers 18. The actuating devices 52, 54 are arranged below the contact plane P in the Z direction. The arrangement of the actuating devices 52, 54 below the contact plane P in the guide track 24 (see FIG. 3) has the advantage that the actuating devices 52, 54 cannot be blocked by accidentally displaced loads, such as ULDs. The actuating devices 52, 54 are thus always accessible from the transfer vehicle 26 in order to be able to actuate the locking devices 22 for locking or release.

In FIG. 4, the locking device 22 is illustrated in its locking position. In the locking position, the locking claws 48, 50 project beyond the plane of movement P in the direction of the Z axis, i.e., the locking claws 48, 50 pass through the plane P. In the locking position of the locking device 22, the locking claws 48, 50 can block a relative movement between the load and the roller track 16 both in the direction of the X axis and in the direction of the Z axis. In order to prevent a relative movement in the Z direction, each of the locking claws 48, 50 has a locking nose 66, 68. The locking noses 66, 68 extend substantially perpendicularly to a wall section 70, 72, which serves as a stop for a load in the direction of the X axis in the locking position. For example, one edge of a ULD can rest against the wall section 70, 72 or be situated in the immediate vicinity of this wall section between the contact plane P and the locking nose 66, 68. In this case, a relative movement of the ULD can be blocked by the locking claws 48, 50 both in the direction of the X axis and in the direction of the Z axis. Each of the locking claws 48, 50 is assigned to a load and can prevent relative movements of this load in the direction of the X axis and in the direction of the Z axis. The loads which are held in position by the locking claws 48, 50 are arranged one behind the other in the X direction, i.e., in the direction of the longitudinal axis L of the cargo hold (see FIG. 1).

As already mentioned, the locking claws 48, 50 are shown in their locking position in FIG. 4. In order to move the locking claws 48, 50 into the release position, the locking claws 48, 50 are pivoted in the direction of arrow SP1 about the pivoting axes SA, as explained below with reference to FIGS. 5 and 6. In the release position, the locking claws 48, 50 extend substantially completely in the roller track 16. In all cases, the locking claws 48, 50 extend below the contact plane P in the release position in order to allow movement of the loads along the roller tracks 16 without hindrance.

Figure 5:
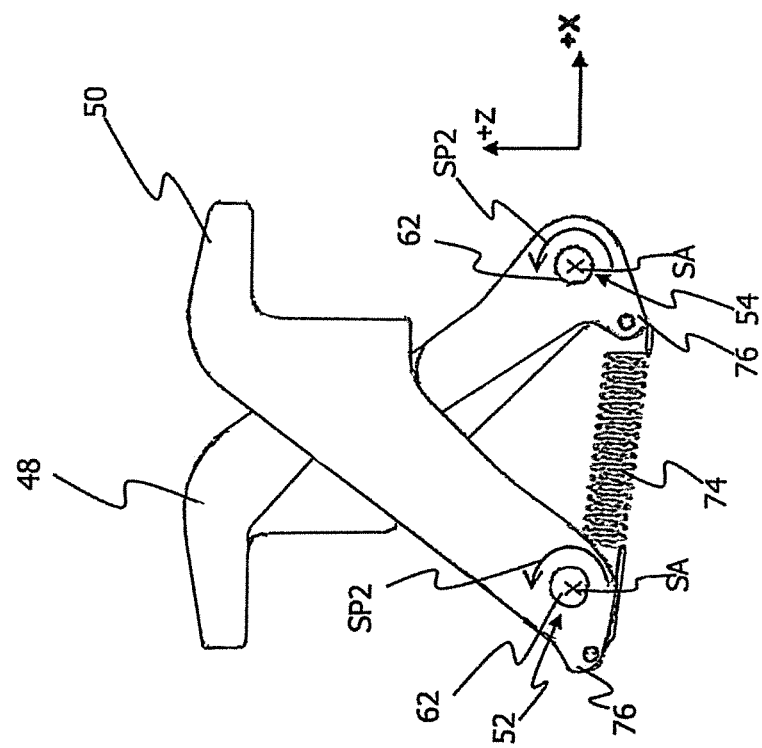
FIG. 5 shows a view of the locking claws of the locking device in the locking position.

FIG. 5 shows a view of the two locking claws 48, 50 in their locking position. Each of the locking claws 48, 50 is connected to a connecting section 62 of the actuating devices 52 and 54. As has already been mentioned above, a rotary motion of the actuating devices 52, 54 and of the connecting section 62 shown in FIG. 5 about the axis SA leads to a pivoting motion of the locking claws 48 and 50 about the axis SA.

The locking device 22 has a spring 74. The locking claws 48 and 50 are connected to one another by the spring 74. Projections 76, on which the spring 74 is secured, are formed on the locking claws 48 and 50. When one of the locking claws 48 or 50 is actuated, the spring 74 enables the other locking claw 48 or 50 to follow the movement of the actuated locking claw 48 or 50.

In order to move the locking claws 48 and 50 into their release position, the actuating section 60 of the actuating device 54 of locking claw 48 is moved counterclockwise in the direction of arrow SP2, as a result of which locking claw 48 is pivoted downwards in the direction of arrow SP2 about the pivoting axis SA. The pair of claws formed by the locking claws 48 and 50 is thereby unlocked. Since the two locking claws 48 and 50 are connected to one another by the spring 74, locking claw 50 follows the movement of locking claw 48. Owing to the spring force of the spring 74 acting between the locking claws 48 and 50, locking claw 50 is likewise pivoted downwards counterclockwise about the pivoting axis SA in the direction of arrow SP2. The pivoting motion, i.e., the lowering, of locking claw 50 can be controlled by the engagement of the transfer vehicle 26 on the actuating section 60 of the actuating device 52 of locking claw 50.

Figure 6:
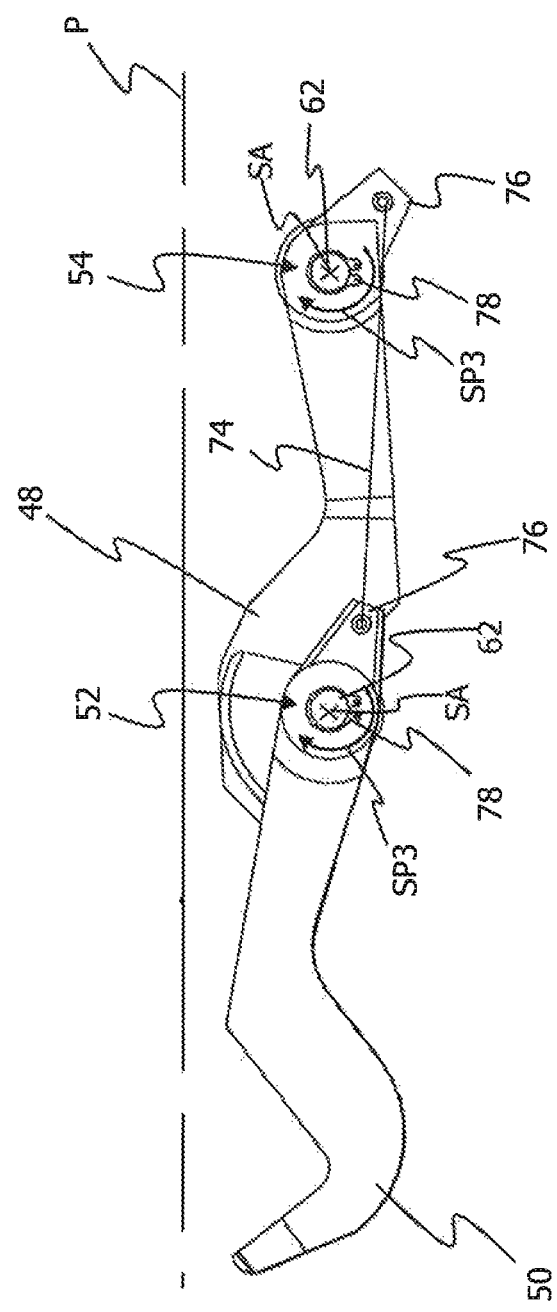
FIG. 6 shows a view of the locking claws in the release position.

In FIG. 6, the locking claws 48, 50 are shown in the release position. In the release position, the two locking claws 48 and 50 are below the contact plane P in order to allow relative movements of a load. In FIG. 6, the spring 74 connecting the locking claws 48 and 50 is illustrated only schematically by a line. The spring 74 is attached to the projections 76 of the locking claws 48 and 50 in the region of the pivoting axis SA. The locking claws 48 and 50 can be held on the connecting section 62 of the actuating devices 52 and 54 by means of circlips 78.

In order to shift the locking claws 48 and 50 into the locking position, the actuating section 60 of the actuating device 52 of locking claw 50 is moved clockwise in the direction of arrow SP3, as a result of which locking claw 50 is pivoted upwards in the direction of arrow SP3 about the pivoting axis SA. Owing to the spring 74, locking claw 48 follows the movement of locking claw 50. Owing to the spring force of the spring 74 acting between the locking claws 48 and 50, locking claw 48 is pivoted upwards clockwise about the pivoting axis SA (arrow SP3) together with locking claw 50. By means of engagement of the transfer vehicle 26 with the actuating section 60 of the actuating device 54 of locking claw 48, the raising of locking claw 48 can take place in a controlled manner.

When the locking device 22 is actuated, the actuating devices 52, 54 perform a rotary motion about the axes SA. When the actuating devices 52, 54 are actuated, the following may be stated in respect of the direction of rotation for the transfer of the locking claws 48, 50 to the release position and the locking position with reference to FIGS. 5 and 6:

The actuating section 60 of actuating device 52 is driven clockwise in order to transfer locking claw 50 to its locking position around the pivoting axis SA.

Under spring load from the spring 74, locking claw 48 follows the movement of locking claw 50 and can additionally be driven clockwise in a controlled manner by the actuating section 60 of actuating device 54 in order to pivot locking claw 48 into its locking position around the pivoting axis SA.

The actuating section 60 of actuating device 54 is driven counterclockwise in order to transfer locking claw 48 to its release position around the pivoting axis SA.

Under spring load from the spring 74, locking claw 50 follows the movement of claw 48 and can additionally be driven counterclockwise in a controlled manner by the actuating section 60 of actuating device 52 in order to pivot locking claw 50 into its release position around the pivoting axis SA.

The same directions of rotation of the actuating devices 52, 54 result from the fact that the locking claws 48, 50 are arranged one behind the other in the direction of the X axis and can thus hold loads such as ULDs arranged one behind the other in the direction of the X axis in their predetermined positions. As can be seen in FIG. 4, the locking claws 48, 50 cross in the locking position, with the result that their locking noses 66, 68 and the wall sections 70, 72 face in opposite directions.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A system for moving a load in an aircraft, comprising:
   a cargo hold floor,
   at least one roller track, which comprises a plurality of rollers arranged one behind the other in the cargo hold floor, wherein the rollers define a plane of movement for the load having a longitudinal direction,
   at least one guide track, which is provided in the cargo hold floor and extends substantially parallel to the at least one roller track,
   at least one transfer vehicle, which is received detachably in the guide track and is configured to be moved along the guide track,
   at least one locking device, which is configured, in a locking position thereof, to block movements of the load relative to the at least one roller track in a direction parallel to the longitudinal direction and in a vertical direction perpendicular to the longitudinal direction and, in a release position thereof, to allow relative movements of the load,
   wherein the at least one locking device is configured to be actuated, by the at least one transfer vehicle in the guide track,
   to shift the at least one locking device out of the release position into the locking position, or
   to shift the at least one locking device out of the locking position back into the release position.

2. The system according to claim 1, wherein the at least one locking device has at least one actuating device, at least one section of which is arranged within the guide track.

3. The system according to claim 2, wherein the at least one transfer vehicle is disposed below the plane of movement.

4. The system according to claim 2, wherein the at least one actuating device is configured to perform a predetermined type of motion to actuate the locking device.

5. The system according to claim 2, wherein the at least one actuating device has at least one actuating section, which is arranged in the guide track, wherein the at least one actuating section is configured with a contour or a profile for actuation by the at least one transfer vehicle.

6. The system according to claim 2, wherein the at least one locking device has at least one locking claw, wherein the at least one locking claw is configured to be pivoted out of the release position into the locking position and back again about at least one pivoting axis by the at least one actuating device.

7. The system according to claim 6, wherein the pivoting axis of the locking claw extends parallel to rotation axes of the rollers of the roller tracks.

8. The system according to claim 6, wherein the at least one actuating device has at least one connecting section, by means of which the at least one actuating device is connected to the at least one locking claw.

9. The system according to claim 8, wherein the connecting section of the at least one actuating device extends through an opening in a side wall of a roller track, wherein an actuating section is arranged on one side of the side wall of the roller track, and the connecting section is connected on the opposite side of the side wall to the at least one locking claw.

10. The system according to claim 1, wherein the at least one locking device is a purely mechanical apparatus.

11. The system according to claim 1, wherein the at least one transfer vehicle has at least one monitoring unit, by which a state of the locking device can be checked.

12. The system according to claim 1, wherein the locking device has at least two locking claws, which are connected to one another by at least one spring element.

13. The at least one transfer vehicle for the system according to claim 1, wherein the at least one transfer vehicle further comprises a coupling element that is pivotable between a first position wherein the coupling element extends above the plane of movement and a second position wherein the coupling element remains below the plane of movement.

14. The system according to claim 1, wherein in the locking position the locking device extends above the plane of movement and in the release position the locking device remains below the plane of movement.

* * * * *